J. G. WISE.
INDEXING MEANS FOR RECORD BOOKS.
APPLICATION FILED NOV. 12, 1909.

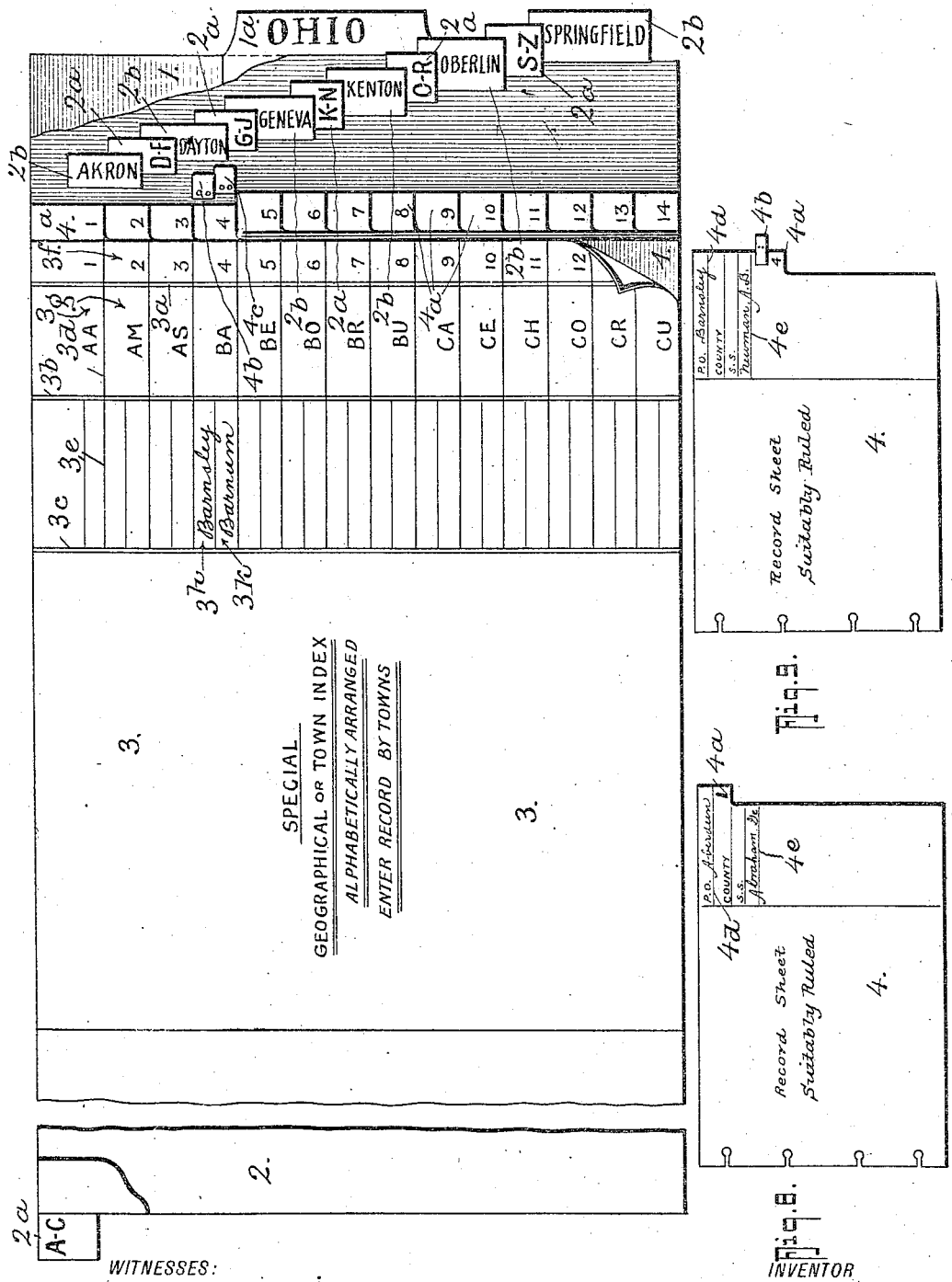

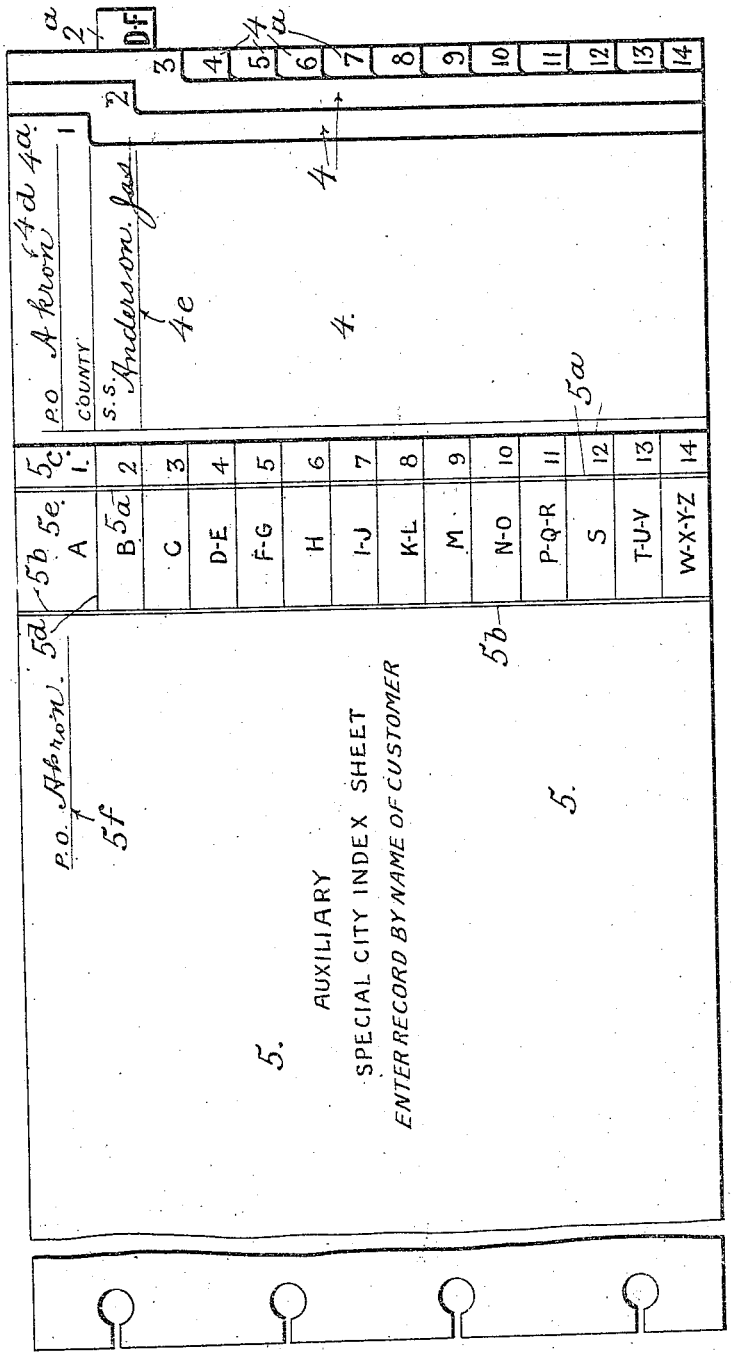

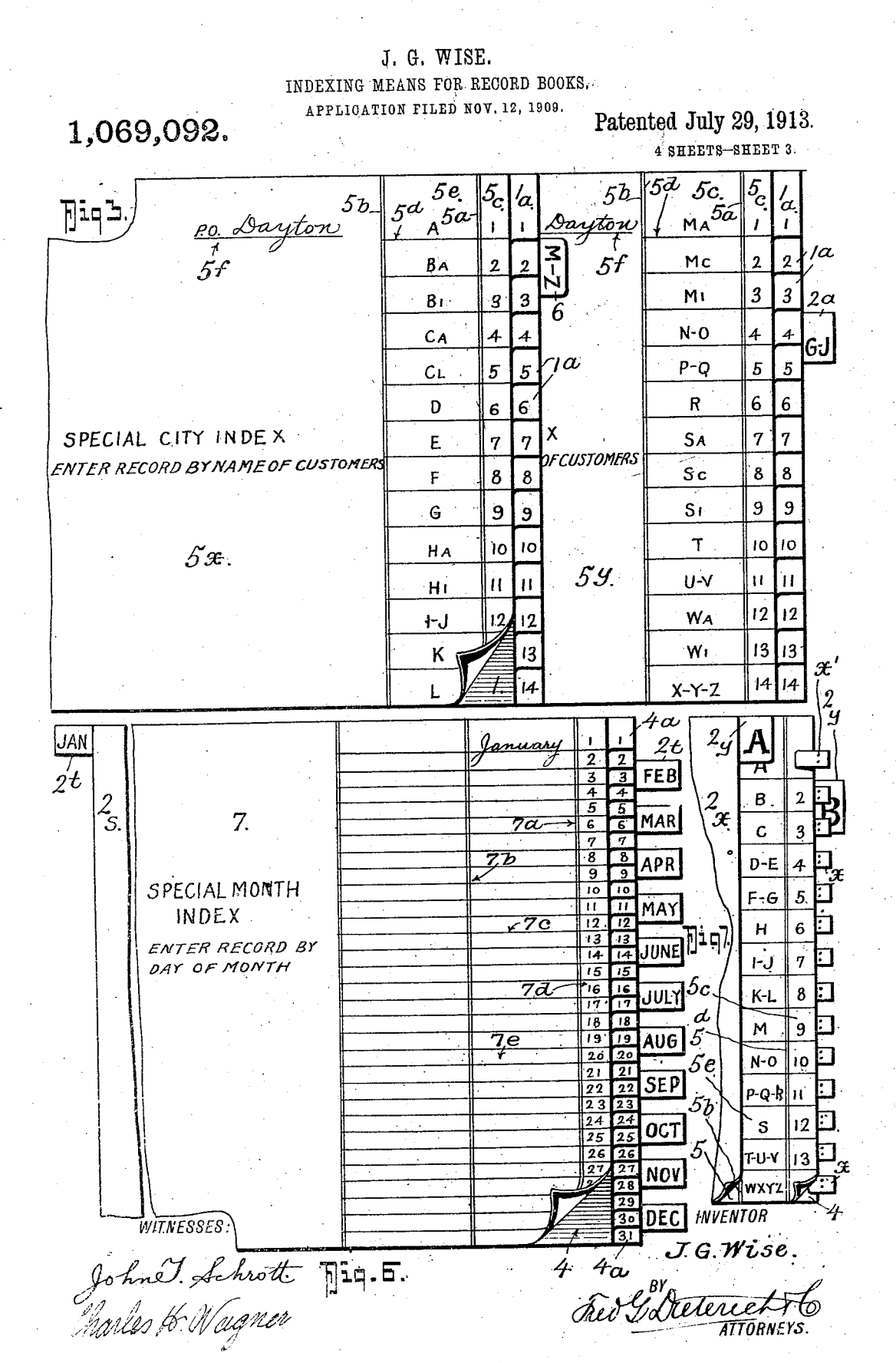

1,069,092.

Patented July 29, 1913.

4 SHEETS—SHEET 3.

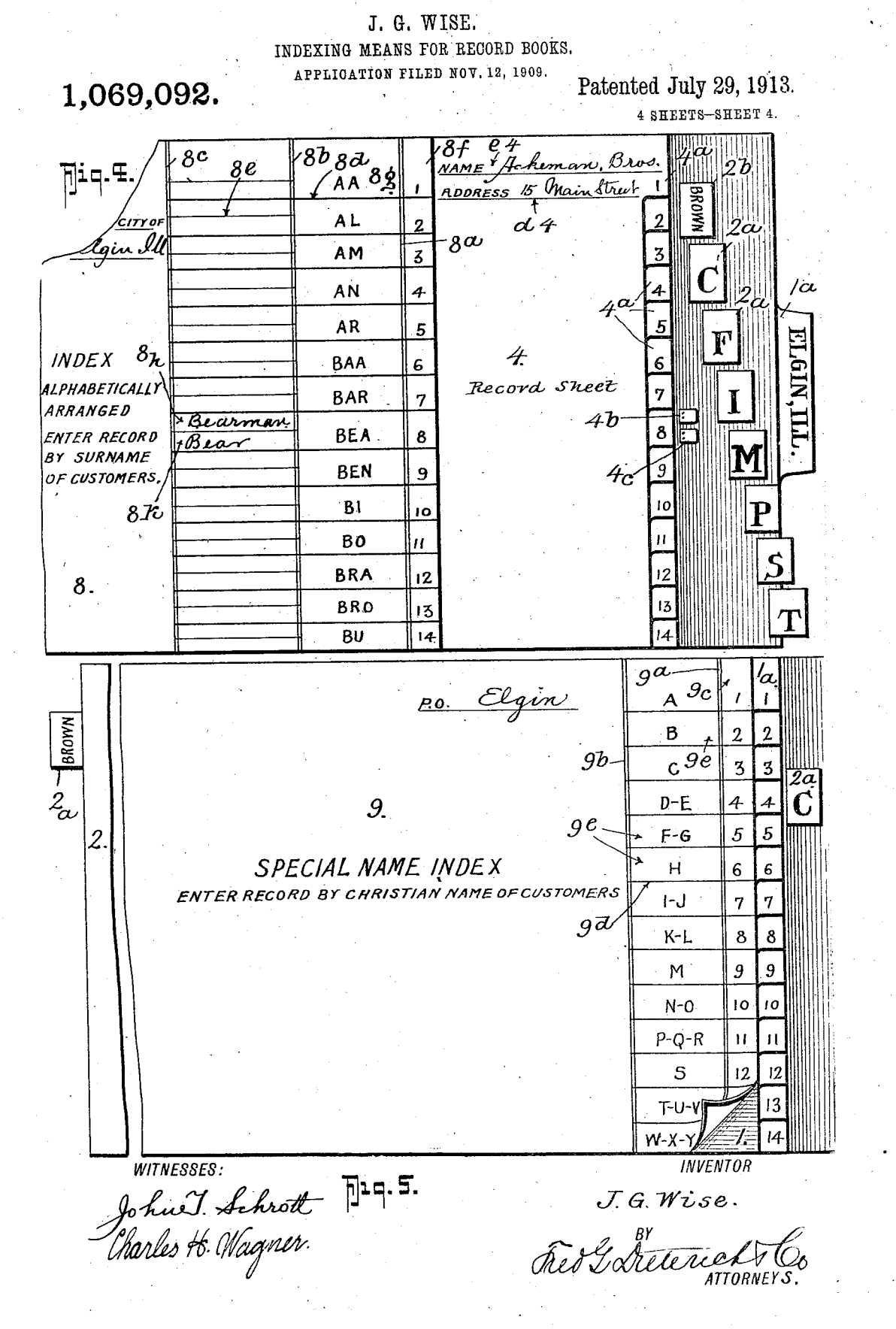

J. G. WISE.
INDEXING MEANS FOR RECORD BOOKS.
APPLICATION FILED NOV. 12, 1909.

1,069,092.

Patented July 29, 1913.

4 SHEETS—SHEET 4.

UNITED STATES PATENT OFFICE.

JOHN G. WISE, OF ELGIN, ILLINOIS.

INDEXING MEANS FOR RECORD-BOOKS.

1,069,092.

Specification of Letters Patent.

Patented July 29, 1913.

Application filed November 12, 1909. Serial No. 527,641.

*To all whom it may concern:*

Be it known that I, JOHN G. WISE, residing at Elgin, in the county of Kane and State of Illinois, have invented certain new and Improved Indexing Means for Record-Books, of which the following is a specification.

My invention has for its object to provide an efficient, easily understood and effective indexing means for record books that is particularly designed for high indexing of large records and that is particularly adapted for indexing ledgers, account books and the like, of the loose-leaf type.

A further object of the invention is to provide an indexing means wherein the advantages of a card index system are combined with a loose-leaf record book.

My invention also has for its object to provide an index of the character stated whereby indexing may be done by geographical divisions and sub-divisions, or by name divisions, or both, and whereby the various types of indexing, (geographical division or name division) may be brought together in a single loose-leaf volume, if desired.

In its generic nature my invention resides in combining with the usual alphabetical tabbed index sheets, special sheet indexes having suitably collected indexing data and identification marks to coöperate with the record sheet which has stepped tabs, (either as an integral part thereof, or as a separate part attached to the sheet), which tabs correspond to the identification marks of the special sheet index and are arranged in stepped relation to one another.

The invention also includes the provision of auxiliary tabs when conditions make necessary.

The invention also resides in those novel details of construction, coöperative arrangement and combination of parts, all of which will be first fully described, and then be specifically pointed out in the appended claims, reference being had to the accompanying drawings, in which:

Figure 1. is a plan open view of a single "State" division section of a record book embodying my invention, the binder and binding backs being omitted, the first alphabetical division sheet being turned over and parts of the various sheets being broken away. Fig. 2, is a plan view of a "special city" section, the general "city" tab sheet being removed to expose the "special State" index sheet, the various sheets being spread out to disclose the various parts. Fig. 3, is a view similar to Fig. 2 of a modification showing two "special city" index sheets to the alphabet. Fig. 4, is a plan view showing a section of a book arranged for use in a single State, wherein the master guides are in "city" divisions instead of "State" divisions. Fig. 5, is a view similar to Fig. 4 with the "Brown" or general name tab sheet turned back to expose the "special name index sheet." Fig. 6, is a plan view showing the application of my invention to date indexing for insurance expiration books and the like. Fig. 7, shows a modified means of providing the record sheets with separable stepped tabs in lieu of integrally formed ones, as in the foregoing forms of the invention. Fig. 8, is a detail view on a small scale of one of the record sheets. Fig. 9, is a similar view of another of the record sheets.

Referring now to the accompanying drawings in which like letters and numerals of reference indicate like parts in all of the figures, and referring particularly to Fig. 1 it will be observed that I provide a master guide sheet 1 which is provided with a master tab $1^a$, on which is indicated the name of a State, it being understood that as many of these sheets 1 with their tabs $1^a$ are used in the book as there are States to be recorded in such book, one only being shown in Fig. 1 of the drawings, and that refers to the State of Ohio. A set of minor guide sheets 2 are provided and these guides are provided with minor tabs $2^a$ on which are printed the letters of the alphabet to form a set of alphabetical guide sheets, it being understood that the sheets 1 and 2 are usually blank sheets and are merely used as partition or guide sheets. Following each of the minor guide sheets 2 a special index sheet 3 is inserted, and this sheet is the essential feature of my invention. One sheet 3 follows the A—C tab guide sheet 2; one sheet 3 follows the D—F tab guide sheet 2; one sheet 3 follows the G—J tab guide sheet 2 and so on throughout the alphabet. The special index sheet 3 is a geographical or town index sheet when the master guide sheet 1 is a State guide sheet. The special geographical index sheet 3 is provided with vertically ruled lines $3^a$—$3^b$—$3^c$ to provide vertical columns traversed by horizontal lines $3^d$ to form numerical spaces $3^f$ and alphabetical spaces $3^g$, as indicated in Fig. 1 of the drawings, it being understood that the spaces 3ᶠ are provided with a suitable number of figures running, 1, 2, 3, 4, 5 and so on down the sheet while the spaces 3ᶠ are provided with letters A—A, A—M, A—S, etc., down the sheet, the letters A—A corresponding to the number 1 and so on, it being understood that the letters and spaces 3ᵍ run within the limits of the A—C portion 2ᵃ of the alphabetical index guides 2, likewise the special index sheet 3 under the D—F division will have its spaces 3ᵍ filled with letters beginning with D—A and run on down the sheet to the sheet having letters G—J, etc., in Fig. 1, as will be readily understood by those skilled in the art. The sheet 3 is also divided between the lines 3ᵇ—3ᶜ by supplemental horizontal lines 3ᵉ to form double spaces 3ʰ—3ᵏ alining with each lettered space 3ᵍ for a purpose presently to appear. Following the special index sheet 3 are the record sheets 4 which are inserted as they may be required, certain of the sheets having tabs 4ᵃ, numbered 1, others having tabs 4ᵃ numbered 2, others having tabs 4ᵃ numbered 3, others having tabs 4ᵃ numbered 4 and so on, the tabs 4ᵃ for the various numbered sheets being provided so they may lie in stepped arrangement as indicated in Fig. 1, so that record sheets whose tabs 4ᵃ bear the number 1 will aline with the number 1 in the space 3ᶠ on the sheet 3 and all those record sheets 4 having tabs bearing the number 2 will have such number aline with the number 2 in the space 3ᶠ in the sheet 3, and so on, as indicated in Fig. 1 of the drawings. The tabs 4ᵃ of the sheets 4 are preferably integrally formed with the sheet by cutting away parts of the sheets to leave the tabs 4ᵃ, as clearly shown in the drawings.

Suppose it is necessary to provide a record for a person, say "George Abraham" of Aberdeen, Ohio: As the indexing is carried on by geographical city divisions, the book-keeper opens the book, by grasping the A—C tab 2ᵃ, to expose the special index sheet 3 following the same, since the city "Aberdeen" comes within the A—C division. He then takes into consideration the second letter of the name of the city and finds that the letter "b" of "Aberdeen" is in the AA division in space 3ᵍ of the special index sheet 3. A glance at the sheet 3 shows that all cities whose second letter lies between A and L inclusive, are to be indexed under the division 1, indicated in space 3ᶠ of sheet 3. Directing his eye across the sheet 3, from left to right, the book-keeper finds that records of parties in the city of "Aberdeen" must be kept on record sheets 4 having the stepped tabs 4ᵃ provided with the indexing number 1, he then takes a sheet 4 from stock, enters the account or record of the said "George Abraham" on such sheet and inserts the sheet 4 in the loose-leaf book, adjacent to the other sheets having the stepped tab 4ᵃ bearing the number 1.

It frequently occurs that certain cities "run strong" in entries, i. e., there are sometimes a very large number of records to be made where the address of a large part of the recorded matter is in a single city and when this is the case I provide auxiliary minor tab sheets 2 that are provided with auxiliary minor tabs 2ᵇ bearing the name of the particular city, such as "Akron" "Dayton", "Geneva", etc., and follow this sheet 2 with an auxiliary city index sheet 5 of similar form to the sheet 3, which sheet 5 is inserted next following the auxiliary minor tabbed sheet 2 that contains the auxiliary minor city tab 2ᵇ. The sheet 5 is provided with vertical printed lines 5ᵃ—5ᵇ and horizontal lines 5ᵈ to divide the sheet at the right hand side into spaces 5ᶜ which carry the numbers 1, 2, 3, etc., and spaces 5ᵉ which carry the letters of the alphabet, A, B, C, etc., as shown in Fig. 2, and the sheet may further be provided with a printed ruled portion 5ᶠ whereon may be written the name of the post-office to which the sheet 5 refers. When a number of accounts in the city of Akron, for example, is to be entered the book-keeper lifts the auxiliary tabbed sheet 2, containing the auxiliary minor city tab 2ᵇ to expose the auxiliary special city index sheet 5. He then notes the surname of the party whose record is to be entered; (say, for example, the record of "James Anderson" of Akron, Ohio, is to be entered). The book-keeper, observing that the surname "Anderson" begins with an "A", knows that name is to be indexed on a record sheet numbered 4, containing a tab 4ᵃ, bearing the number 1 as that number is indicated by the number 1 in the space 5ᶜ, opposite the letter "A" in the space 5ᵉ of the sheet 5. Surnames beginning with "B" would be entered on a record sheet numbered 4 having a tab 4ᵃ on which the number 2 appears and so on. As certain cities run only slightly heavier in entries than other cities which are provided with the special index tabs 2ᵇ, I need not provide for those by minor tab sheets with the tabs 2ᵃ, but may enter the names of such cities in the proper spaces 3ʰ—3ᵏ on the special geographical index sheet 3 that follows the alphabetical tabbed sheet 2. For example, suppose there are six entries to make under the town of Barnesly and six under the town of Barnum, the book-keeper writes the words "Barnesly" and "Barnum" in the spaces 3ʰ—3ᵏ to the left of the "BA" space 3ᵍ on the sheet 3 and affixes a small metal clip 4ᵇ in alinement with the word "Barnesly" to the first record sheet 4, in the Barnesly set of sheets and a small clip 4ᶜ in alinement with the word "Barnum" to the first of the Barnum set of tabs 4, as shown in Fig. 1, of the drawings. Thus should it be desired to find the name of, say, A. B. Newman of Barnesly, Ohio, the book-keeper opens the book, by grasping the A—C tab 2$^a$ of the sheet 2 to expose the special index tab 3, (see Fig. 1). He then finds that the town of Barnesly is specially indexed on the sheet 3 by an entry in the space 3$^h$ and then grasps the clip 4$^b$ to aline with the word "Barnesly" and opens the book at that point, thus exposing the first of the "Barnesly" entries and he then runs over the Barnesly entries which are found between the clips 4$^b$—4$^c$ until the desired name is found. In the example just given the sheet 4 would be the first sheet of the Barnesly set (see Fig. 9).

The record sheets 4 may be provided with any suitable ruling or record matter as that is immaterial to my invention as the printing on the sheets 4 will depend upon the use to which the book is to be put. The sheets 4, however, are usually provided with lines 4$^e$—4$^d$ upon which the name and address of the party whose record is to be entered on the respective sheet, may be written.

Instead of using a single sheet 5 on which the entire alphabet is indicated, two or more sheets 5$^x$—5$^y$ may be used in lieu thereof, see Fig. 3, and the alphabetical lettering for the spaces 5$^e$ may be distributed equally over such sheets. In this case I attach a clip 6 to a blank sheet and insert such sheet in advance of the second special index sheet 5$^y$, the clip 6 having thereon letters to indicate the range or limit of alphabetical lettering on the sheet 5$^y$ that follows the same, so that the book-keeper may readily turn to the sheet 5$^y$ in making his entries or looking up accounts, as will be readily understood by reference to Fig. 3, of the drawings. Each of the sheets 5—5$^x$—5$^y$ may be provided with ruled portions 5$^y$ on which the book-keeper may enter the name of the respective city to which said sheet has reference.

When my invention is to be used in indexing books wherein the master guides are city guides (see Fig. 4,) I provide the master tab 1$^a$ with the name of the particular city, instead of a State name, as indicated in the form shown in Fig. 1, and provide minor guide tabs 2 with alphabetical tabs 2$^a$, as before and follow each of the minor tabbed guides 2 with a special alphabetically arranged index sheet 8 to guide in entering names according to the surname of the customer, the sheet 8 corresponding in its ruling and numbering and lettering to the sheet 3 and is provided with vertical ruled lines 8$^a$—8$^b$—8$^c$ and horizontally ruled lines 8$^d$—8$^e$ to provide spaces 8$^f$—8$^g$—8$^h$—8$^k$, as shown in Fig. 4.

When my invention is used for indexing names in a city, the name of the customer is not entered according to the geographical location of his residence but according to his surname, that is, all parties whose surnames have the first two letters ranging between AA and AK, for example, are entered on record sheets 4 having their tabs 4$^a$ provided with the number 1, since the surnames whose first two letters range between AA and AK correspond to the division 1 in the spaces 8$^f$ on the sheet 8 and so on throughout. Where the names run excessively heavy, such as "Brown" for example, an auxiliary minor tab guide 2 having an auxiliary minor tab 2$^b$ containing the particular name (Brown) is inserted in the book, preferably in the proper order with the alphabetical arrangement and following such "Brown" guide sheet 2 a special name index sheet 9, corresponding in ruling and form to the sheet 5, is provided, this sheet having vertically ruled lines 9$^a$—9$^b$ and horizontal lines 9$^e$ to divide the sheets into spaces 9$^c$—9$^d$, the first set 9$^e$ having numbers 1, 2, 3, etc., and the second set having alphabetical letters A, B, C, etc., as shown in Fig. 5 of the drawing. In entering accounts under this section, of course, all of the surnames will be "Brown," therefore an account is entered under the Christian name of the particular "Brown." For example, supposing the account is desired for "Alexander Brown," his record will be placed on a sheet having a stepped tab 1$^a$, numbered 1, as "Alexander" begins with an "A." Again, supposing a record for "Henry Brown" of Elgin, Illinois, is to be made, his record is entered on a sheet having a stepped tab 1$^a$ bearing the number 6, as the name "Henry" begins with an "H," and so on, the sheets being inserted in their proper place in the loose-leaf book.

When it is desired to apply my invention to monthly index books for keeping track of premium dates for insurances and the like I substitute in lieu of the minor alphabetical guide tabs 2, monthly guide sheets 2$^s$ whose tabs 2$^t$ are provided with indexes for the various months of the year, January, February, March, etc., as shown in Fig. 6, of the drawing and following each of the tabbed sheets 2$^s$, I insert a special monthly index sheet 7 having parallel ruled lines 7$^a$ and preferably horizontally ruled lines 7$^e$ to divide the sheet into two or more columns one of which forms a number column, containing the days of the month in sequence, that is, 1, 2, 3, 4, 5, 6, etc., and so on down the column. In applying this form of the invention the book-keeper writes the word "January" in the space 7$^e$ opposite the number 1 as that is the first month of the year and all insurance premiums coming due on the first of January are entered on record sheets 4 having a stepped tab 4$^a$ bearing the number 1; all insurance coming due on January 2nd, therefore would be entered on record sheet 4 having stepped tabs 4$^a$, bearing the number 2 and so on throughout the days of the month. Thus when it is necessary to notify policy holders, whose insurance comes due on the fifth of January, the book-keeper opens the book, by grasping the January tab 2ᶠ to expose the January special index sheet 7 and then grasping the leaves 4 at the tab number 5 he opens the book at that place, thus exposing the first of the names or list of names or other data which indicate that such policies expire on that day. Similarly all policies expiring on any day of any other month will follow. On the "February" sheet 7 the word "February" would be entered in space 7ᵉ opposite the number 2, as February is the second month in the year, and so on with the other months.

Instead of providing the record sheets 4 with integrally stepped tabs 4ᵃ they may be provided with removable clips $x$ arranged in stepped form, as shown in Fig. 7. It is not necessary in applying my invention to print the numbers 1, 2, 3, 4, 5, etc., on the tabs 4ᵃ or on the clips $x$ as the corresponding numbers in the columns on the special index sheets will indicate that only those record sheets 4 whose tabs correspond in position to the respective numbers are to be followed in opening the book to turn to a particular account, although I prefer to print such numbers on the tabs 4ᵃ.

In the form shown in Fig. 7, the first clip $x'$ is preferably secured to the special index sheet 5 so as to avoid wasting a record sheet, as will be readily understood by those skilled in the art to which the invention appertains.

One or more master guides together with minor and auxiliary guides may be used in a single book, as conditions may require, and one or all of the forms of my index may be brought together in a single loose-leaf book, if found desirable, and I do not limit myself to the exact arrangement, the essential feature of my invention being the provision of the special index sheets in conjunction with the minor tabbed guide sheets and the stepped tabbed record sheets.

In practice the special index sheets are preferably of a different color than the record sheets and the special index sheets are of the same dimensions over all as are the record sheets exclusive of the tabs 4ᵃ. The record sheets 4 are preferably individual sheets, that is, the record of only one individual firm, corporation and association is entered on a sheet and the "record" that is to be entered on the sheet will depend upon the particular use to which the book is placed. For example, if the sheets 4 are to be ordinary ledger sheets they will be ruled as are ordinary ledger sheets to receive entries of money transactions. If they are to contain a record of any other character they will be correspondingly ruled.

From the foregoing description taken in connection with the accompanying drawings it is thought the complete arrangement, operation and numerous advantages of my invention will be readily understood by those skilled in the art to which the invention appertains, and I desire to say that slight changes in the detail arrangement of parts and in the particular printing and ruling on the various sheets may be made without departing from the spirit of the invention or the scope of the appended claims.

What I claim is:

1. As a means for keeping records, a plurality of guides having alphabetical tabs, record sheets between said guides, said record sheets having tabs in stepped arrangement, a special index sheet for each set of record sheets, said special index sheet having a column of identification numbers, and said record sheet tabs having like identification numbers, and said special index sheet having a column of letters related to and parallel with said column of numbers, substantially as shown and described.

2. As a means for keeping records, a plurality of guides having alphabetical tabs, record sheets between said guides, said record sheets having tabs in stepped arrangement, a special index sheet for each set of record sheets, said special index sheet having a column of identification numbers, and said record sheet tabs having like identification numbers, said special index sheet having a column of letters related to and parallel with said column of numbers, said special index sheet having suitably ruled lines and spaces designated to receive identification names in column arrangement parallel to the column of letters, and supplemental tab members secured to certain of said record sheets to identify said sheets with the names in said special index sheet spaces.

3. As a means for keeping records, a plurality of guides having alphabetical tabs, record sheets between said guides, said record sheets having tabs in stepped arrangement, a special index sheet for each set of record sheets, said special index sheets having a column of identification numbers, said record sheet tabs having like identification numbers, said special index sheet having a column of letters related to said column of numbers, all of said special index sheets being of a distinctive color differing from that of said record sheets.

4. As a means of keeping records, a plurality of guide sheets having alphabetical tabs, record sheets between said guides, said record sheets having tabs in stepped arrangement, a special index sheet for each set of record sheets, said special index sheet having a column of identification numbers, said record sheet tabs having like identification numbers, said special index sheet having a column of letters related to said column of numbers, said special index sheet having suitably ruled lines and spaces to receive identification names in column arrangement, supplemental tab members secured to certain of said record sheets to identify said sheets with the names in said special index sheet spaces, said special index sheets being of a distinctive color differing from that of said record sheets.

5. As a means for keeping records, a plurality of guides having alphabetical tabs, record sheets between said guides, said record sheets having tabs in stepped arrangement, a special index sheet for each set of record sheets, said special index sheets having a column of identification numbers, said record sheet tabs being in horizontal alinement with said identification numbers, said index sheet having a column of letters parallel to and related to said column of numbers, auxiliary guides having tabs bearing a word and a special index sheet for each of said auxiliary guides of like form to said other special index sheets.

6. As a means for keeping records, a plurality of guides having alphabetical tabs, record sheets between said guides, said record sheets having tabs in stepped arrangement, a special index sheet for each set of record sheets, said special index sheet having a column of identification numbers, said record sheet tabs being in horizontal alinement with said identification numbers, said index sheet having a column of letters parallel to and related to said column of numbers, auxiliary guides having tabs bearing a word, a special index sheet for each of said auxiliary guides of like form to said other special index sheets, said first mentioned special index sheets being of a distinctive color differing from that of said record sheets and said auxiliary special index sheet being of a color differing from that of said first mentioned special index sheets.

7. In a loose-leaf record book, a master tabbed guide, and a plurality of alphabetical tabbed guides therefor, and auxiliary minor tabbed word guides, said auxiliary guides subdividing the subject-matter of said master guides, record sheets interposed between adjacent ones of said guides, a special index sheet interposed between each adjacent pair of guides, each of said special index sheets having numerical and alphabetical identification marks for the record sheets that coöperate therewith, the record sheets having stepped tabbed portions provided with identification marks like those of said special index sheet.

8. In a loose-leaf record book, a set of individual record sheets each having projecting tab portions, the tab portions of the set being arranged in stepped formation, combined with a special index sheet having printed thereon a column of identification marks along one edge adjacent to and related to the stepped tab portions of said set of record sheets and having a second column of identification letters paralleling the column of identification marks and coöperating therewith, substantially as shown and described.

9. In a loose-leaf record book, a special index sheet having a binding edge and having a column of figures printed along the edge opposite the binding edge and having a second column of letters paralleling the column of figures and related thereto and a set of record sheets comprising a series of identification tabs, each one of the series bearing an identification mark in alinement with a related identification mark on the index sheet, substantially as shown and described.

10. As a means for keeping records, a plurality of guides having alphabetical tabs, record sheets between said guides, said record sheets having tabs in stepped arrangement, a special index sheet for each set of record sheets, said special index sheets having a column of identification numbers, said record sheet tabs having like identification numbers, said special index sheet having a column of letters related to said column of numbers.

JOHN G. WISE.

Witnesses:
 LYMAN R. BAYARD,
 G. A. ROWE.